United States Patent
Mauger et al.

(10) Patent No.: US 12,362,568 B2
(45) Date of Patent: Jul. 15, 2025

(54) MODULAR MULTIPORT AC BATTERY POWER CONVERTER SYSTEMS AND METHODS OF USING SAME

(71) Applicant: Georgia Tech Research Corporation, Atlanta, GA (US)

(72) Inventors: Mickael J. Mauger, Atlanta, GA (US); Aniruddh Marellapudi, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/282,875

(22) PCT Filed: Apr. 5, 2022

(86) PCT No.: PCT/US2022/023529
§ 371 (c)(1),
(2) Date: Sep. 19, 2023

(87) PCT Pub. No.: WO2022/216738
PCT Pub. Date: Oct. 13, 2022

(65) Prior Publication Data
US 2024/0162713 A1 May 16, 2024

Related U.S. Application Data

(60) Provisional application No. 63/170,790, filed on Apr. 5, 2021.

(51) Int. Cl.
*H02J 3/32* (2006.01)
*B60L 50/51* (2019.01)
(Continued)

(52) U.S. Cl.
CPC .............. *H02J 3/322* (2020.01); *B60L 50/51* (2019.02); *H02J 3/36* (2013.01); *H02M 1/0058* (2021.05);
(Continued)

(58) Field of Classification Search
CPC .......... H02J 3/322; H02J 3/36; H02J 2310/48; B60L 50/51; B60L 2310/42; H02M 1/0058; H02M 7/53871
(Continued)

(56) References Cited

U.S. PATENT DOCUMENTS 9,065,321 B2 * 6/2015 Divan .................... H02M 7/493
10,673,327 B2 * 6/2020 Mondal .................... H02J 9/00
(Continued)

OTHER PUBLICATIONS

International Search Report and Written Opinion from Application No. PCT/US2022/023529 dated Jul. 18, 2022.
(Continued)

*Primary Examiner* — Hal Kaplan
(74) *Attorney, Agent, or Firm* — Troutman Pepper Locke LLP; Ryan A. Schneider; Korbin Blunck

(57) ABSTRACT

An exemplary embodiment provides a power conversion system comprising a first battery module, a second battery module, first and second transformers, and first, second, and third current source converter bridges. The transformers can have low voltage sides and high voltage sides. The first bridge can be configured to connect the battery modules and the low voltage sides of the transformers. A mid-point of the serial connection of the battery modules can be connected to a mid-point of the series connection of the transformers. The second bridge can connect to the high voltage side of the first transformer and one or more ports configured to transmit electrical power to and/or receive electrical power from an electrical load and/or source. The third bridge can be con-
(Continued)

figured to connect to the high voltage side of the second transformer and the one and one or more ports.

33 Claims, 10 Drawing Sheets

(51) Int. Cl.
    *H02J 3/36*     (2006.01)
    *H02M 1/00*     (2007.01)
    *H02M 7/5387*     (2007.01)

(52) U.S. Cl.
    CPC ..... *H02M 7/53871* (2013.01); *B60L 2210/42* (2013.01); *H02J 2310/48* (2020.01)

(58) Field of Classification Search
    USPC .......................................................... 307/91
    See application file for complete search history.

(56) References Cited

U.S. PATENT DOCUMENTS

| | | | |
|---|---|---|---|
| 10,696,182 B2 * | 6/2020 | Khaligh | H01F 27/38 |
| 11,214,158 B2 * | 1/2022 | Lee | B60L 53/11 |
| 11,588,397 B2 * | 2/2023 | Zhu | H02M 3/33571 |
| 2008/0192510 A1 | 8/2008 | Falk | |
| 2012/0250369 A1 | 10/2012 | Furukawa | |
| 2013/0201733 A1 | 8/2013 | Divan et al. | |
| 2016/0172984 A1 | 6/2016 | Takagi | |
| 2018/0222333 A1 | 8/2018 | Khaligh et al. | |
| 2018/0269782 A1 | 9/2018 | Mondal | |
| 2020/0412238 A1 | 12/2020 | Zhu et al. | |
| 2021/0008995 A1 | 1/2021 | Lee et al. | |

OTHER PUBLICATIONS

Extended European Search Report from Application No. 22785321.5 dated Apr. 28, 2025.

* cited by examiner

MODULAR MULTIPORT AC BATTERY POWER CONVERTER SYSTEMS AND METHODS OF USING SAME

CROSS-REFERENCE TO RELATED APPLICATIONS

This application claims the benefit of U.S. Provisional Application Ser. No. 63/170,790, filed on 5 Apr. 2021, which is incorporated herein by reference in its entirety as if fully set forth below.

FIELD OF THE DISCLOSURE

The various embodiments of the present disclosure relate generally to power converter systems, and more particular to modular multiport AC battery power converter systems with integrated low voltage battery and improved safety for touch voltage conditions.

BACKGROUND

Battery powered transportation, from bicycles to cars to trucks to aircraft rated at a few hundred watts to over 20 MW, is key in the drive to decarbonize the energy infrastructure. A typical battery pack consists of parallel connected arrays of 4 volt Li-ion cells, which are then connected in series to realize the desired battery pack voltage of 400-1000 volts or more. Given the history of battery fires and critical battery related safety issues, there is a strong focus in the industry on safety, including electrical, mechanical, and thermal management, followed by rigorous testing, including crash and rollover tests. With an increase in the number of electric vehicles (EVs) on the road, comes the fact that many will be involved in accidents, some of them severe and occurring under challenging environmental conditions. Compared with gasoline cars, the most troubling new safety concern is the high-voltage battery system that poses additional lethality for passengers, bystanders, and first responders. The auto industry's response included increased mechanical and structural integrity of an integrated battery-pack and deployment of explosive pyro fuses that disconnect the battery terminals upon impact. However, in case of an accident where the battery is breached, there will still be potential exposure to lethal voltages. Furthermore, the trend of increasing system voltages has triggered deep concern within organizations such as the National Fire Protection Association (NFPA) and the National Highway Traffic Safety Administration (NHTSA). It is critical that the EV industry tackle this concern before it becomes a major public relations and liability issue or stops EV market growth in its tracks.

This problem has been recognized by the auto and telecom industries, leading to the development of 48 volt DC systems that are considered intrinsically touch-safe, where no harmful touch potential is present anywhere in the system. 48 volt DC systems have been used by the auto industry for mild hybridization to meet fuel efficiency standards, and more recently for small EVs. While the intrinsic safety of 48-volt DC systems is well understood, the ability to scale to the power levels required has challenged available technology. This has led to the development of high voltage battery packs with thousands of cells, spanning the length and width of the vehicle and involving complex battery management systems (BMS) for cell-level control, and elaborate techniques for protection, dielectric insulation, and thermal management, all causing significant impacts on battery life, performance, and the ability to mix and match fast-moving battery technologies. These constraints are in addition to the safety issues discussed earlier.

The battery pack also defines everything else on the vehicle. For example, a typical car may have one 120 KW inverter driving a motor for propulsion as shown in FIG. 1. This inverter drive operates from the high voltage battery and typically relies on the 2-level voltage source inverter (VSI) structure shown in FIG. 2. An AC/DC isolated converter is also provided on-board to allow direct connection to 208-240 VAC for Level-2 charging. Fast charging for electric vehicles is also an important feature to address fleet charging and range anxiety, with charging rates of 50 kW to 300 kW for cars to date, and up to 2 MW for trucks. Infrastructure for DC fast charging typically used is expensive, with total cost expected to exceed $50B in the US alone. This is employed because putting the high-power DC charger on-board has been considered to be impractical because of size and cost. Even with fast charging capability, there are serious limitations. With a large number of cells connected in series in the battery pack, even charging of the cells is paramount, involves complex BMS system, and requires the charging current for the entire stack to be reduced early in the charging cycle if battery overcharging and fires are to be avoided. Thus, it is clear that design decisions regarding the architecture of the power system, especially one that assumes that the battery must be maintained as one single stack, lead to serious compromises in overall system safety, cost, and performance.

BRIEF SUMMARY

An exemplary embodiment of the present disclosure provides a power conversion system comprising a first battery module, a second battery module, a first transformer, a second transformer, a first current source converter bridge, a second current source converter bridge, and a third current source converter bridge. The second battery module can be serially connected to the first battery module. The first transformer can have a low voltage side and a high voltage side. The second transformer can have a low voltage side and a high voltage side, wherein the low voltage side of the first transformer can be serially connected to the low voltage side of the second transformer. The first current source converter bridge can be configured to connect the first and second battery modules and the low voltage sides of the first and second transformers, wherein a mid-point of the serial connection of the first and second battery module can be connected to a mid-point of the series connection of the first and second transformer. The second current source converter bridge can be configured to connect to the high voltage side of the first transformer and one or more ports configured to transmit electrical power to and/or receive electrical power from an electrical load and/or source. The third current source converter bridge can be configured to connect to the high voltage side of the second transformer and the one and one or more ports configured to transmit electrical power to and/or receive electrical power from an electrical load and/or source.

In any of the embodiments disclosed herein, the first converter bridge can comprise a first switching circuit configured to selectively connect a first pole of the first battery module and an opposite pole of the second battery module to a terminal of the low voltage winding of the first transformer.

In any of the embodiments disclosed herein, the first switching circuit can comprise a first controllable switch serially connected with a second switch.

In any of the embodiments disclosed herein, the first controllable switch can be a Si MOSFET.

In any of the embodiments disclosed herein, the second switch can be one of a diode, controllable switch, and a GaN HEMT.

In any of the embodiments disclosed herein, the first switching circuit can further comprise a resonant pole network connected in parallel with the serially connected first controllable switch and second switch.

In any of the embodiments disclosed herein, the resonant pole network can be configured to enable a ZVS turn-OFF and ZCS turn-ON of the first controllable switch in the first switching circuit.

In any of the embodiments disclosed herein, the resonant pole network can comprise a capacitor serially connected to a resistor-diode circuit.

In any of the embodiments disclosed herein, the resistor-diode circuit can provide a different impedance during charging and discharging of the capacitor of the first resonant pole network.

In any of the embodiments disclosed herein, the first switching circuit can comprise a clamping device configured to allow power to flow from the first transformer to the second battery module.

In any of the embodiments disclosed herein, the clamping device can be one of a diode, a controllable switch, and a GaN HEMT.

In any of the embodiments disclosed herein, the first switching circuit can comprise a first controllable switch serially connected with a second switch, and the first switching circuit can further comprise a bypass capacitor connected in series to the clamping device so that the series connection of the bypass capacitor and the clamping device can be connected in parallel to the first controllable switch serially connected to the second switch.

In any of the embodiments disclosed herein, the first power converter bridge can comprise a second switching circuit configured to selectively connect a first pole of the second battery module and an opposite pole of the first battery module to a terminal of the low voltage side of the second transformer.

In any of the embodiments disclosed herein, the second switching circuit can comprise a first controllable switch serially connected with a second switch.

In any of the embodiments disclosed herein, the first controllable switch can be a Si MOSFET.

In any of the embodiments disclosed herein, the second switch can be one of a diode, controllable switch, and a GaN HEMT.

In any of the embodiments disclosed herein, the second switching circuit can further comprise a resonant pole network connected in parallel with the serially connected first controllable switch and second switch.

In any of the embodiments disclosed herein, the resonant pole network can be configured to enable a ZVS turn-OFF and ZCS turn-ON of the first controllable switch in the second switching circuit.

In any of the embodiments disclosed herein, the resonant pole network can comprise a capacitor serially connected to a resistor-diode circuit.

In any of the embodiments disclosed herein, the resistor-diode circuit can provide a different impedance during charging and discharging of the capacitor of the resonant pole network.

In any of the embodiments disclosed herein, the second switching circuit can comprise a clamping device configured to allow power to flow from the second transformer to the first battery module.

In any of the embodiments disclosed herein, the clamping device can be one of a diode, a controllable switch, and a GaN HEMT.

In any of the embodiments disclosed herein, the second switching circuit can comprise a first controllable switch serially connected with a second switch, and the second switching circuit can further comprise a bypass capacitor connected in series to the clamping device so that the series connection of the bypass capacitor and the clamping device can be connected in parallel to the first controllable switch serially connected to the second switch.

In any of the embodiments disclosed herein, the first switching circuit comprises a clamping device configured to allow power to flow from the first transformer to the second battery, the first power converter bridge can comprise a second switching circuit configured to selectively connect a first pole of the second battery module and an opposite pole of the first battery module to a terminal of the low voltage side of the second transformer, the second switching circuit can comprise a first controllable switch serially connected with a second switch, the second switching circuit can comprise a clamping device configured to allow power to flow from the second transformer to the first battery, the first controllable switch serially connected with the second switch of the first switching circuit can be connected in series to the clamping device of the second switching circuit, and the clamping device of the first switching circuit can be connected in series to the serially connected first controllable switch and second switch of the second switching circuit.

In any of the embodiments disclosed herein, the power converter system may not comprise a resonant circuit connected in parallel across the low voltage sides of the first and/or second transformers.

In any of the embodiments disclosed herein, the second current source converter bridge can comprise a first resonant circuit connected in parallel to the high voltage side of the first transformer, and the third current source converter bridge can comprise a second resonant circuit connected in parallel to the high voltage side of the second transformer.

In any of the embodiments disclosed herein, at least one of the second and third current source converter bridges can comprise at least one reverse blocking switch.

In any of the embodiments disclosed herein, the at least one reverse blocking switch can comprise a controllable switch connected in series to a diode.

In any of the embodiments disclosed herein, the at least one reverse blocking switch can comprise a first and second controllable switch connected in series with opposite current blocking orientation.

In any of the embodiments disclosed herein, the power conversion system can be configured such that a maximum voltage in the system is a voltage level of the first or second battery modules when the first, second, and third current source converter bridges are inactive.

In any of the embodiments disclosed herein, the voltage level of the first or second battery modules can be less than 60 Volts.

In any of the embodiments disclosed herein, the first current source converter bridge can be configured to operate in a switching cycle.

In any of the embodiments disclosed herein, the switching cycle can comprise a cross-clamped phase wherein power flows from at least one of the first and second transformers to at least an opposite battery pole through at least one clamping device.

In any of the embodiments disclosed herein, the first current source converter bridge can be configured such that a majority of leakage energy from at least one of the first and second transformers can be recovered into at least one of the first and second battery modules.

In any of the embodiments disclosed herein, the power conversion system can be configured to operate in a fail-safe state wherein all controllable power devices connected to the first, second, and third current source converter bridges are turned OFF and magnetizing current of at least one of the first and second transformers is discharged into the at least one of the first and second battery modules.

In any of the embodiments disclosed herein, the one or more ports of the second and third current source converter bridges can comprise a first port connected to a first electric motor.

In any of the embodiments disclosed herein, the one or more ports of the second and third current source converter bridges can comprise a first port connected to a first electrical motor and a second port connected to a charging terminal.

In any of the embodiments disclosed herein, the one or more ports of the second and third current source converter bridges can further comprise a third port connected to a second electrical motor.

In any of the embodiments disclosed herein, the one or more ports of the current source converter can further comprise a second port connected to a second electrical motor.

Another embodiment of the present disclosure provides a modular battery system comprising a first power conversion system and a second power conversion system. The first power conversion system and the second power conversion system can be connected in parallel on one or more ports of the first and second power conversion systems configured to transmit electrical power to and/or receive electrical power from an electrical load and/or source.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As explained below, the present disclosure is directed to power converter systems. For purposes of explanation, embodiments below are described in the context of a Modular Multiport AC Battery (MMACB), which can be used as a universal building block to meet a wide variety of end-use applications that can benefit from intrinsic safety, especially in electric transportation. The MMACB can limit the maximum voltage present in the system while the power conversion system is turned-off (i.e semiconductors are gated OFF) to <60 volts, defined as touch-safe or non hazardous voltage, and can scale to hundreds of kilowatts. The MMACB can integrate the battery and all needed power converters into an intelligent multiport building block that can: (1) manage the battery including BMS, charging, and protection; (2) provide multiple output ports for EV traction and vehicle charging/fast-charging; (3) allow use of multiple MMACBs to achieve advanced functions including grid-support, vehicle to grid (V2G), and autonomous bottom-up microgrid formation; and (4) can be fully protected and safe in the case of electrical faults, accidents, system failure or physical damage to the system. Additionally, the MMACB can allow unparalleled flexibility, creating a technology agnostic building block that can be interoperable with future battery and power converter technologies.

Figure 1:
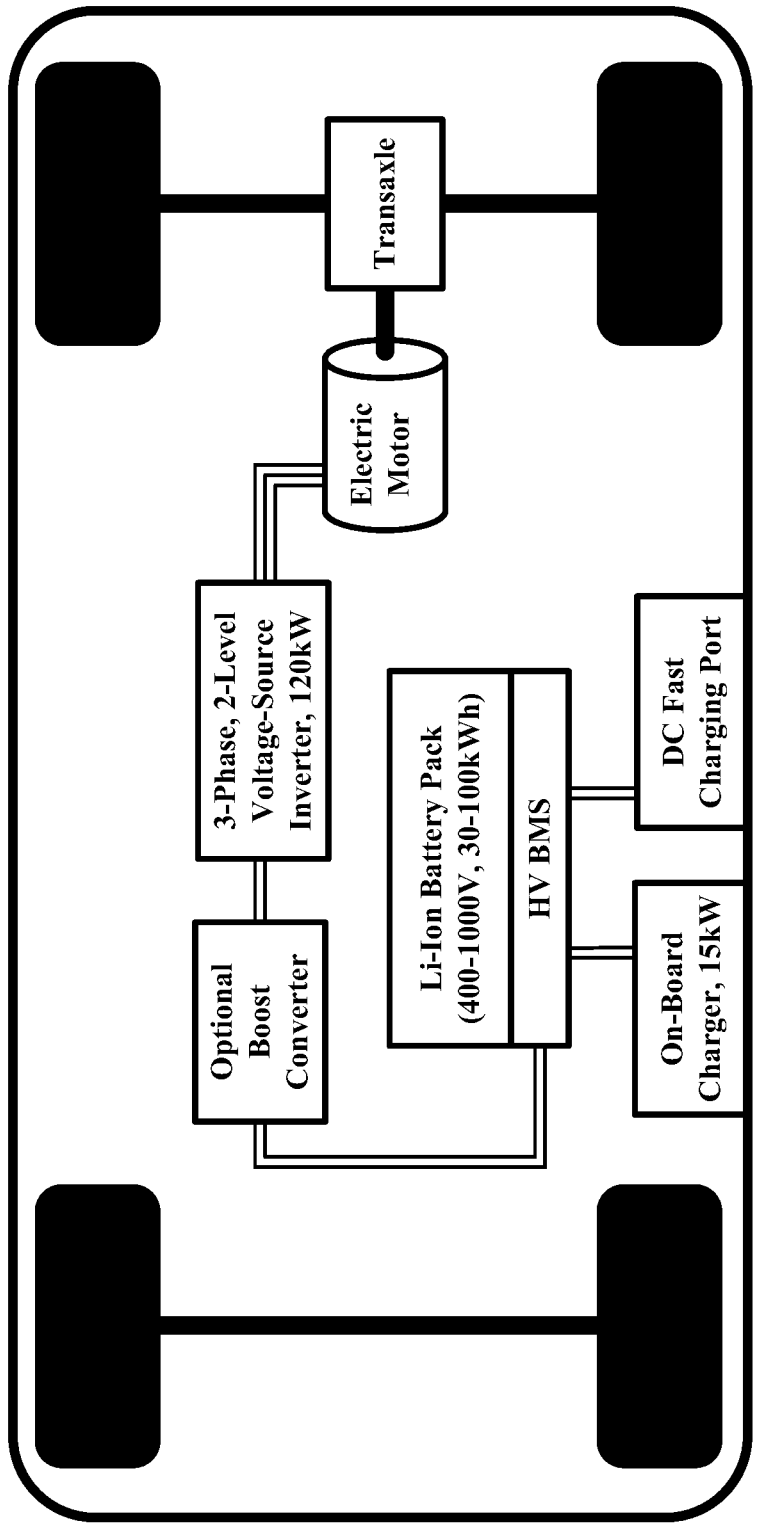
FIG. 1 shows a conventional 2-level voltage source inverter used in a motor drive application for electric vehicle.
Figure 2:
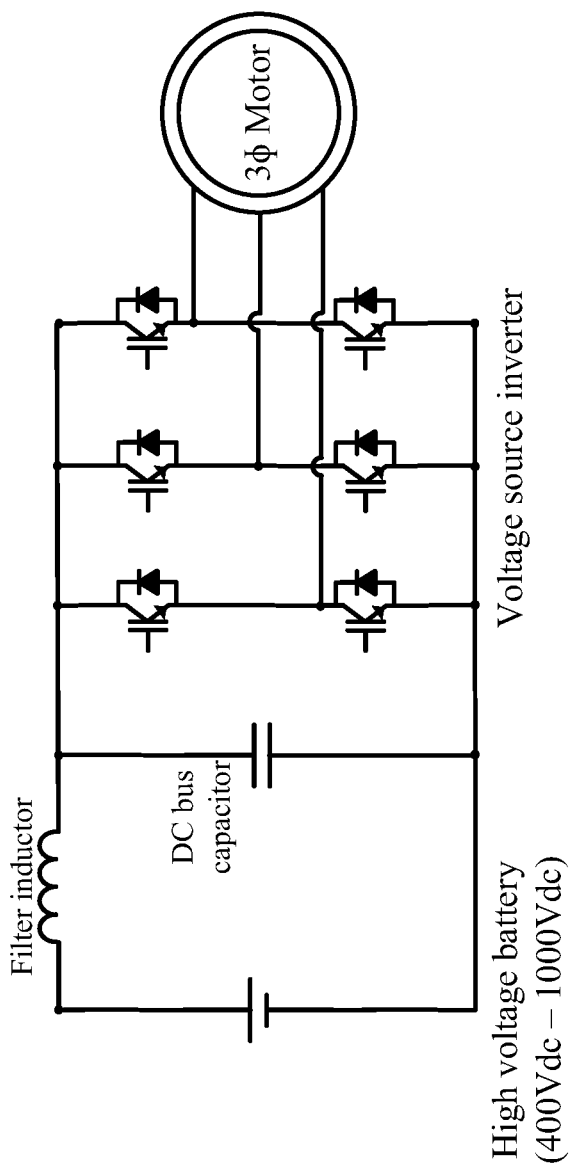
FIG. 2 shows a conventional electric vehicle power architecture using a high voltage battery pack.
Figure 3:
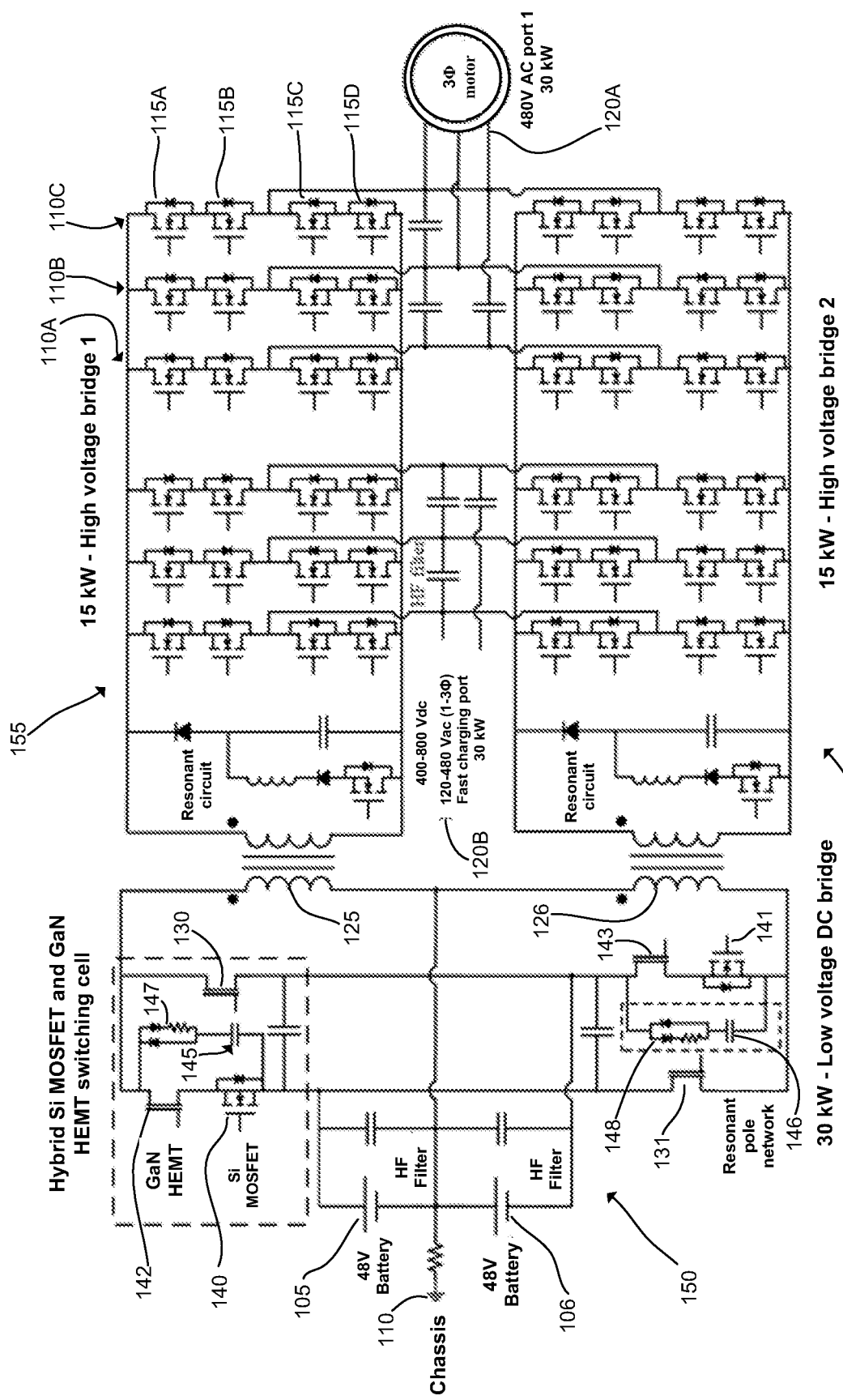
FIG. 3 provides an exemplary configuration of a power converter system realizing two high-voltage ports for an electric vehicle application (one three-phase inverter port and one three-phase AC or DC fast-charging port) from two low voltage battery modules, and using the series connection of two controllable switches (e.g. dual MOSFET structure) for the high-voltage converter bridges, in accordance with an exemplary embodiment of the present disclosure.

As shown in FIG. 3, the MMACB can comprise a first power converter bridge 150, a second power converter bridge 155, and a third power converter bridge 160. The second power converter bridge 155 can be connected to the first power converter bridge 150 via a first transformer 125, such that the first power converter bridge 150 is connected to the low voltage side of the first transformer 125 and the second power converter bridge 155 is connected to the high voltage side of the first transformer 125. The third power converter bridge 160 can be connected to the first power converter bridge 150 via a second transformer 126, such that the first power converter bridge 150 is connected to the low voltage side of the second transformer 126 and the third power converter bridge 160 is connected to the high voltage side of the second transformer 126.

In some embodiments, the MMACB can make use of Soft Switching Solid State Transformer (S4T) converters for the high-voltage bridge, and a novel CSI bridge structure for the low-voltage battery bridge, as shown in FIG. 3. The S4T converters are disclosed in PCT Application Nos. PCT/US2017/033186, PCT/US2019/042969, and PCT/US2021/038232. The MMACB can realize a multiport converter that can manage power flows between the battery modules and one or more high-voltage AC and DC ports (e.g., motors, charging terminals, etc.), can be fully bi-directional, and can achieve a high boost conversion ratio with high-frequency galvanic isolation.

As shown in FIG. 3, an exemplary MMACB can incorporate two 48-volt batteries 105, 106 rated at ~15 kWh with a 1C continuous discharge (15 kW) and a 2C peak discharge capability (30 kW of peak power) per module into the first power converter bridge 150. The midpoint of the battery pack is connected to chassis-ground 110 with a high impedance to ensure that touch voltages do not exceed 48 volts under any fault or breach conditions. The converter can use a hybrid switching cell structure based on GaN HEMTs and Si MOSFETs for the low-voltage battery stage and a dual common-source SiC MOSFET configuration for the high voltage stage. The topology can operate under soft switching conditions to achieve switching frequencies>25 kHz, with efficiencies of 96.5-98.5% over a wide operating power range. The MMACB can feature filtered waveforms, low EMI, and coordinated control that allows paralleling of modules to hundreds of kilowatts and allows precise exchange of energy between ports and between modules as needed per 40 us converter switching cycle. Further, as a current source converter, the MMACB can operate without a large DC-link capacitor, can be immune to shoot-through and short-circuit faults, can offer a fully protected DC port for the battery, can manages the leakage inductance of the transformer with a loss-less energy recovery mechanism, and can operate at higher temperatures than typical converters.

Figure 4:
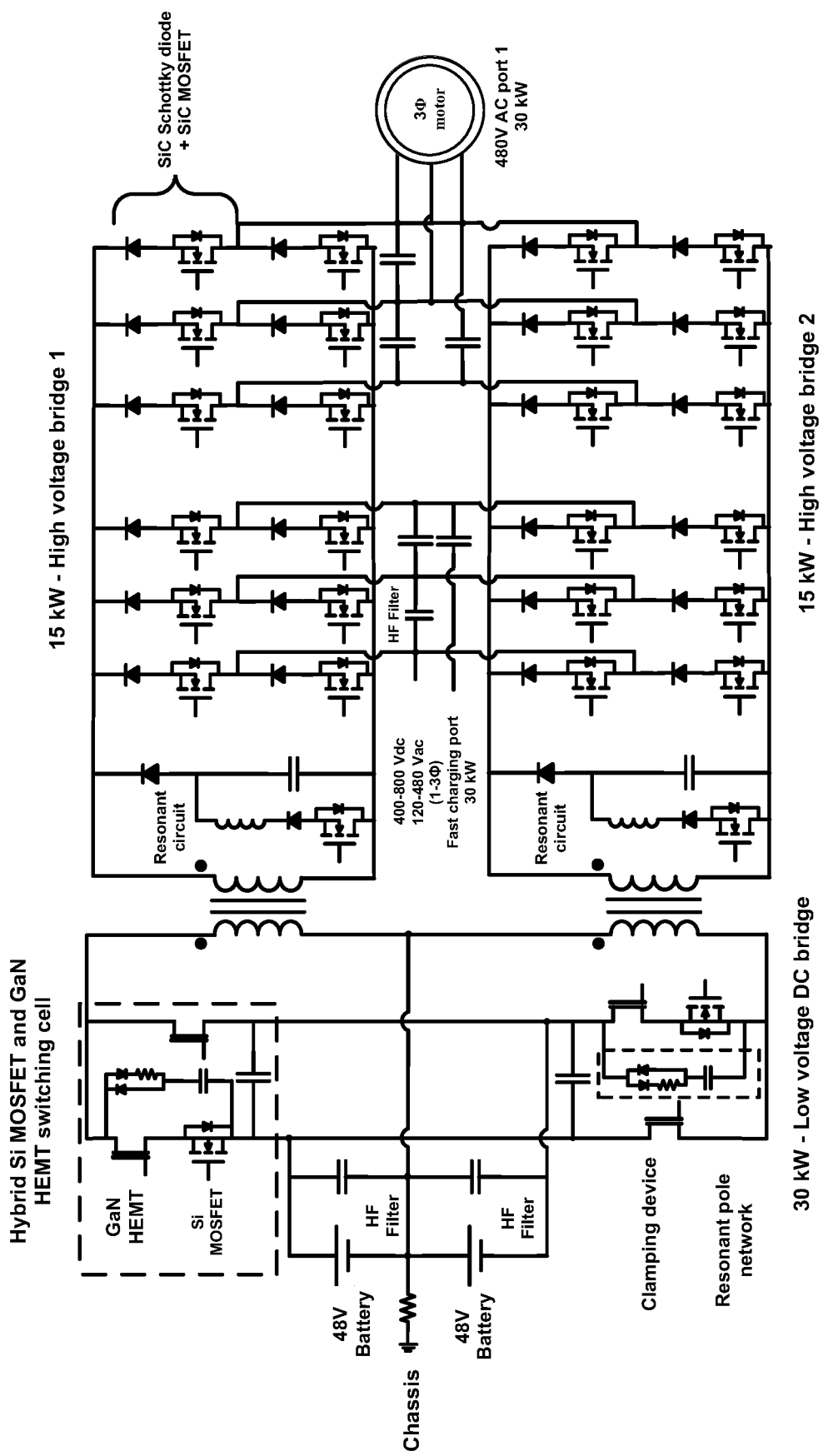
FIG. 4 provides an exemplary configuration of a power converter system realizing two high-voltage ports for an electric vehicle application (one three-phase inverter port and one three-phase AC or DC fast-charging port) from two low voltage battery modules, and using the series connection of a diode and a controllable switch (e.g. MOSFET) for the high-voltage converter bridges, in accordance with an exemplary embodiment of the present disclosure.

The high-voltage bridges 155, 160 can comprise several inverter poles or phase legs 110A-C, each including four controllable (also referred to as active) switches 115A-D connected in series. The switches 115A-D can be many switches known in the art. In some embodiments, the switches 115A-D are SiC MOSFETs (FIG. 3). In some other embodiments (as shown in FIG. 4), the switches can be the series connection of a SiC MOSFET and a SiC Schottky diode. The converter system can provide one or more ports 120A-C to allow power to flow between a source/load and the converter system. For example, one port 120A can be used to connect an electric motor to the converter. The number of inverter poles 110A-C can be extended as needed to provide additional connection ports—e.g., for an on-board DC or AC fast charger 120B (FIG. 3), and for a second three-phase traction inverter 120C (FIG. 5) without a significant penalty on the power density.

As shown in FIG. 3, the MMACB can use a split DC-link structure on the low voltage DC stage with a center-tap point used to connect to the mid-point of the battery pack formed by the series connection of the two battery modules 105, 106. This split DC-link can be realized using two series-connected high-frequency transformers 125, 126, providing galvanic isolation and boost conversion ratio for the topology.

Figure 5:
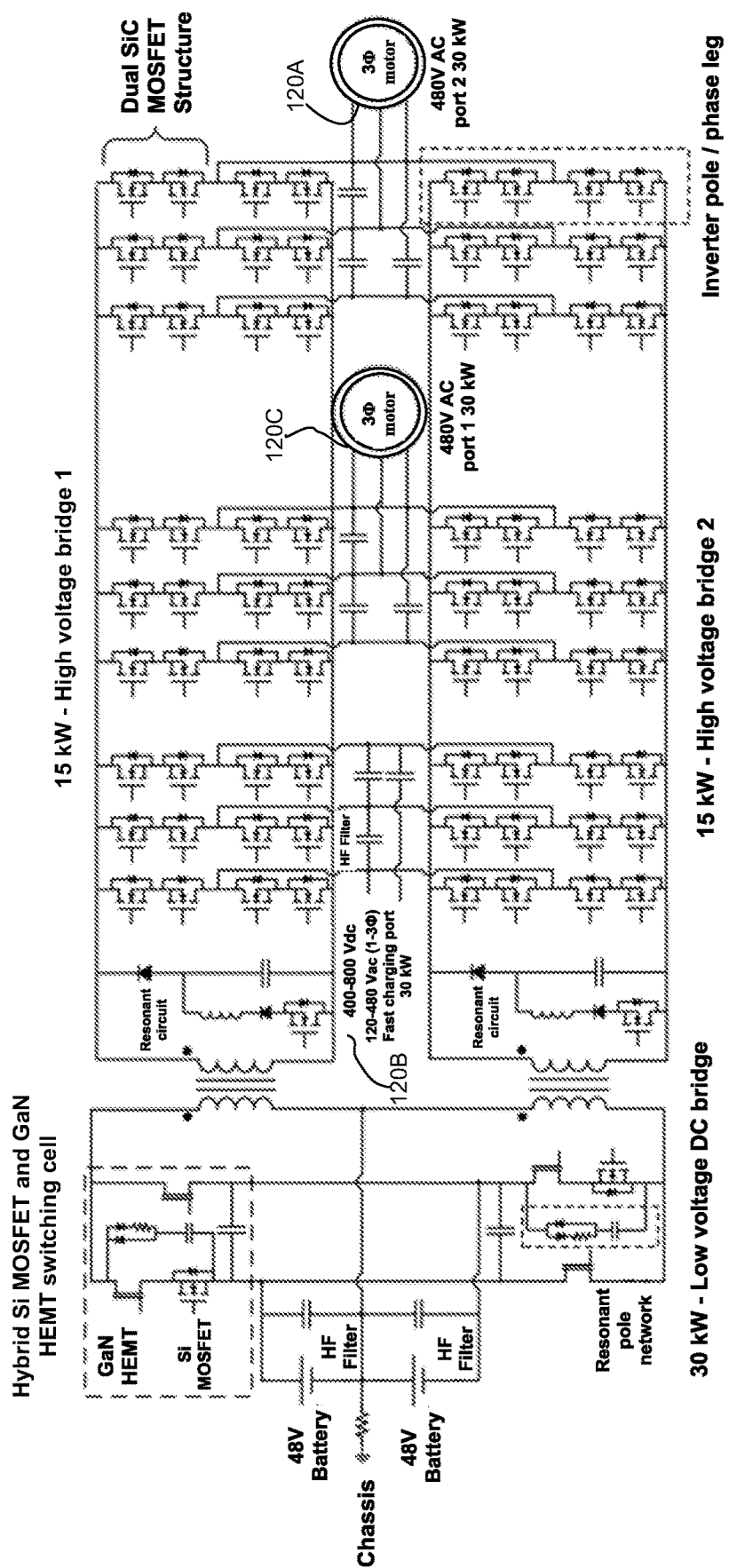
FIG. 5 provides an exemplary configuration of a power converter system realizing three high-voltage ports for an electric vehicle application (two three-phase inverter ports and one three-phase AC or DC fast-charging port), from two low voltage batteries in accordance with an exemplary embodiment of the present disclosure.

Furthermore, the DC-link bridge comprises two clamping devices 130, 131 that can naturally turn ON during the switching transitions of the bridge and when all controllable power devices of the topology are turned OFF. This provides a path for the magnetizing current of the transformers to flow, enables the lossless leakage energy recovery mechanism of the topology, and gives a unique safety mechanism wherein the current DC-link is safely discharged into the battery in case of a converter fault. This cross-clamped mode of operation is unique to the proposed MMACB and simplifies the resonance sequence on the conventional S4T-based high-voltage bridges. There is virtually no fault-mode for the MMACB, and the battery can always be protected, with little or no possibility of short-circuit. In some embodiments, as shown in FIGS. 3 and 5, the cross-clamping devices 130, 131 can be implemented with GaN HEMTs to reduce conduction losses. In some embodiments, the cross-clamping devices 130, 131 can be implemented with diode technologies inherently immune to reverse recovery (e.g. SiC Schottky diodes).

The Si MOSFET 140, 141 and series GaN HEMT 142 143 (this device could again be replaced with a reverse-recovery-less diode technology such as a SiC Schottky diode) of one first battery pole, and the clamping device connected to the opposite battery pole form a novel hybrid switching circuit, as shown in FIG. 3. To enable a ZVS turn-OFF and ZCS turn-ON of the active devices (e.g. Si MOSFETs) of the low voltage DC bridge, a resonant pole network, realized by the series connection of a capacitor 145, 146 and charge/discharge resistor-diode circuit 147, 148, is connected across the composite active switch circuit (Si MOSFET 140, 141+ GaN HEMT 142, 143) within the hybrid switching cell. This provides a new soft-switching mechanism for the low-voltage DC bridge of the MMACB, without the use of an additional S4T resonant tank on the low-voltage bridge. This fundamental difference from the conventional S4T structure enables the MMACB to scale to power ranges inaccessible to the S4T using a low-voltage input battery.

The two high-voltage bridges of the MMACB can employ conventional S4T bridges with ZVS of all main power devices, and can operate in an interleaved manner to further reduce the filter requirements.

Figure 6:
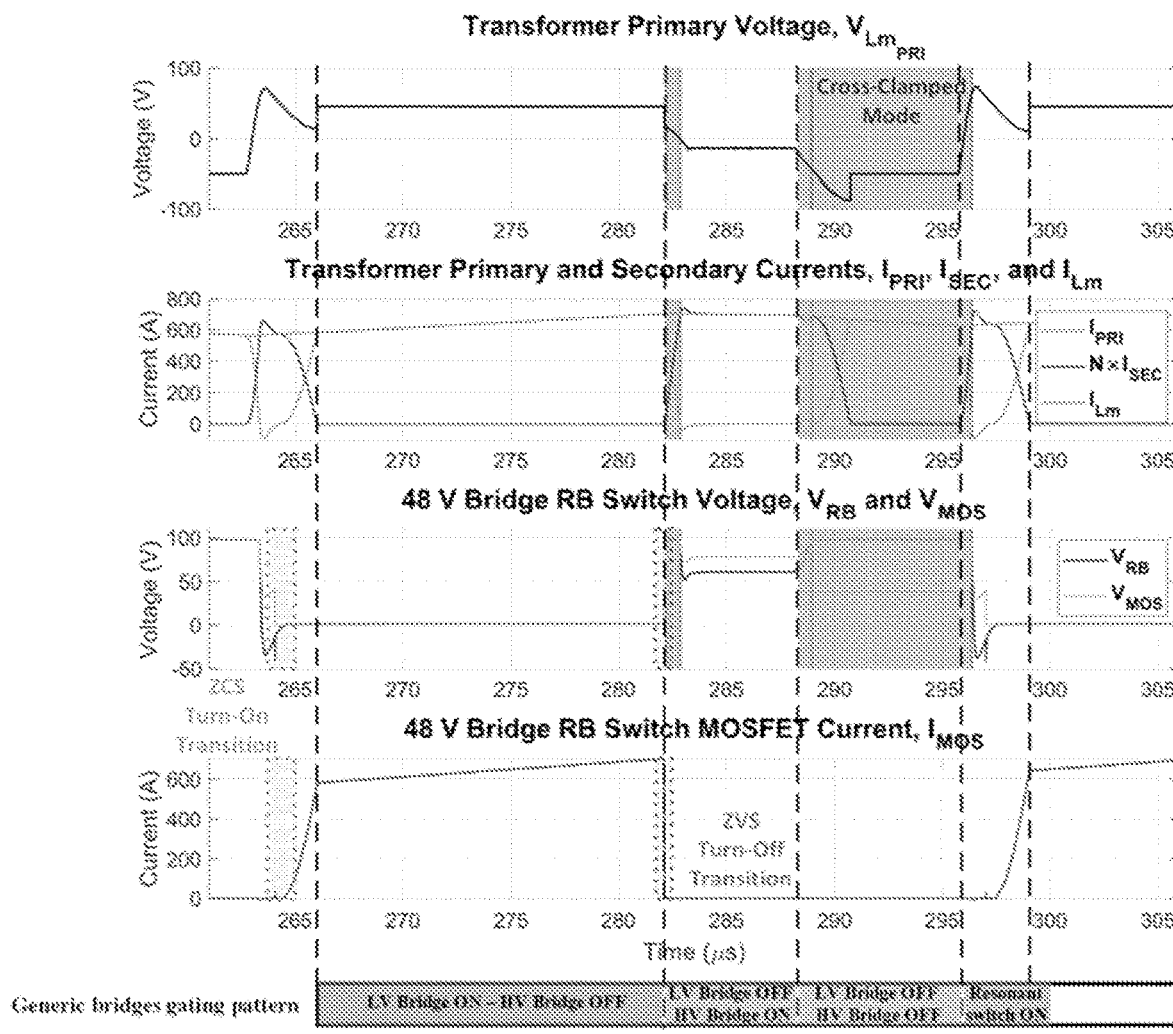
FIG. 6 provides an exemplary switching waveform of a power converter system, in accordance with an exemplary embodiment of the present disclosure.

FIG. 6 provides exemplary simulation waveforms of an exemplary MMACB over a switching cycle, highlighting the cross-clamped operating mode. During the switching transitions, the cross-clamping operation controls and clamps the device voltage stress on the low-voltage bridge to the nominal DC battery voltage (2×48 V=96 V in this example) while the bridge is switching over 600 amperes at this 30 kW operating point in this exemplary design. The cross-clamped operation also provides a loss-less management mechanism of the energy trapped in the leakage inductance of the transformer, where the magnetizing current transitions from the LV bridge to the HV bridge as highlighted in FIG. 6.

This operating mode is also enabled during the switching cycle by gating off all power devices, which discharges the DC-link current into the battery as shown in the figure. This provides an energy recovery mechanism when the converter is used to charge the battery, but also a unique fall back or fail-safe function for the DC-link current to naturally and safely be discharged to 0 A in case of converter faults without leading to catastrophic failure as would have been the case with conventional current-source inverters.

Figures 7A, 7B:
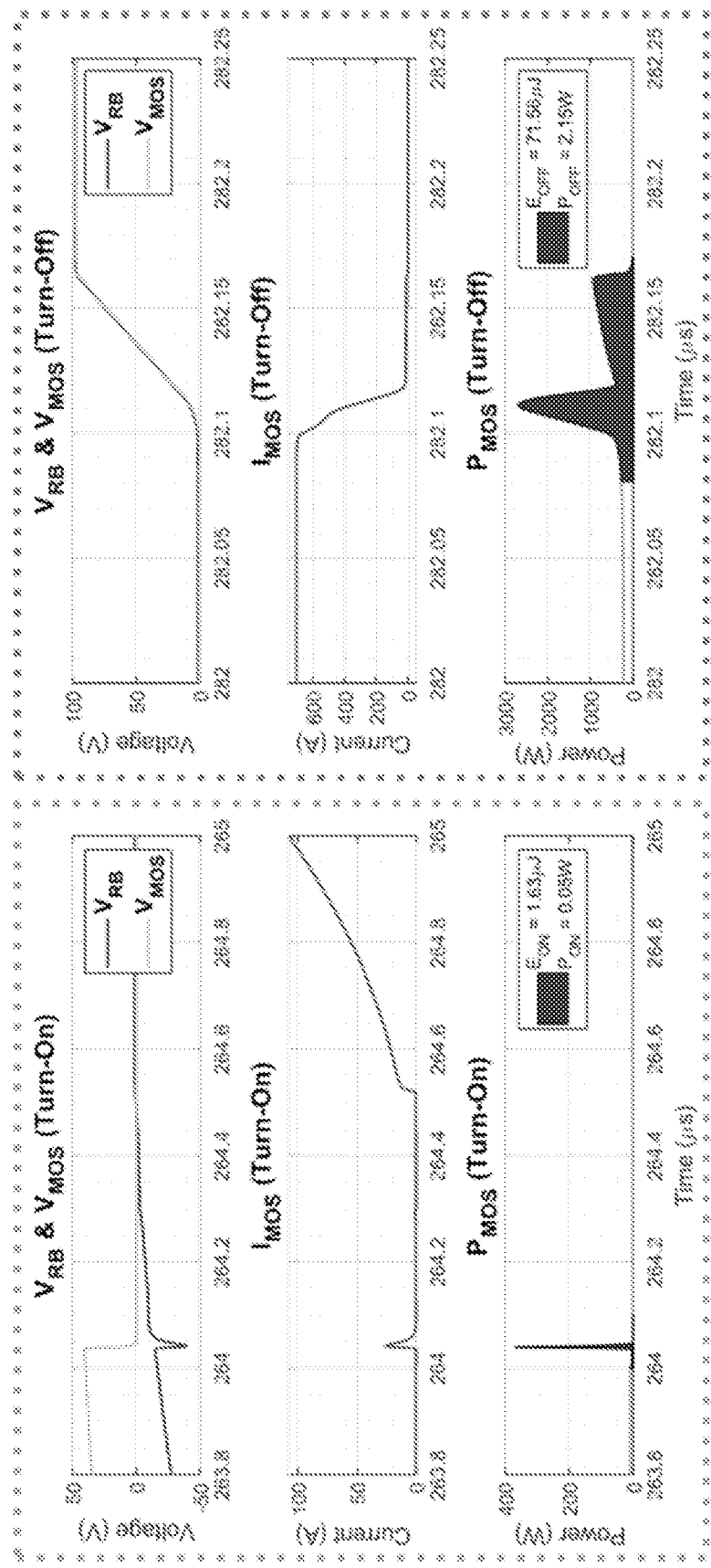
FIGS. 7A-7B provide exemplary switching transitions of a controllable or active switch (Si MOSFET) in the low-voltage bridge of a power converter system, in accordance with an exemplary embodiment of the present disclosure.

The turn-OFF and turn-ON transitions of one of the active Si MOSFETs in the LV bridge of the MMACB are highlighted in FIG. 6 and are shown in greater detail in FIG. 7A. At turn-OFF, the resonant pole network provides zero-voltage switching (ZVS) as seen in the zoomed switching waveforms in FIG. 7B, with virtually no switching losses (estimated to ~72 µJ turn off energy) for a commercial device switching 96V at 600 A in this example. Similarly, at turn-ON, FIG. 7A, the S4T operation of the high voltage bridges discharges the resonant pole network of the switch and the Si MOSFET turns ON under zero-current switching (ZCS) conditions. As highlighted in FIG. 7A, the switching loss at turn ON in this commercial MOSFET is negligible for a device switching 96V and 600 A in this example. This soft-switching approach, unique to the MMACB, is key to enabling high conversion efficiency, with a low-voltage bridge operating at such high current levels with the target low-voltage level and high-power rating.

The control of the MMACB can follow the basic principles of the S4T topology, with each LV and HV bridge applying a series of voltage levels, or active vectors, and with one bridge transferring power at a time during the active phases. The active vectors are sorted from most positive to most negative voltage and applied successively throughout the switching cycle. Generic gating patterns for the LV bridge pole and the corresponding HV bridge are shown alongside the simulation waveforms in FIG. 6. One significant deviation from typical S4T operation can be observed during the cross-clamped operating mode, where all active devices of both the LV and HV bridge are turned off. In this case, the cross-clamping device can naturally turn ON and applies a negative voltage from the opposite battery pole to discharge the DC link current $I_{Lm}$. This can greatly improve the control robustness of the MMACB as any control error, miss-gating, gate driver failure or device failure does not lead to uncontrolled DC-link current levels or overvoltage conditions. Furthermore, the resonance sequence control of the S4T bridge is also simplified by systematically clamping the resonant tank voltage to a known voltage level, determined by the cross-clamped mode, before turning on the resonant switch to exit the cross-clamped mode and initiate the resonance phase.

Figure 8:
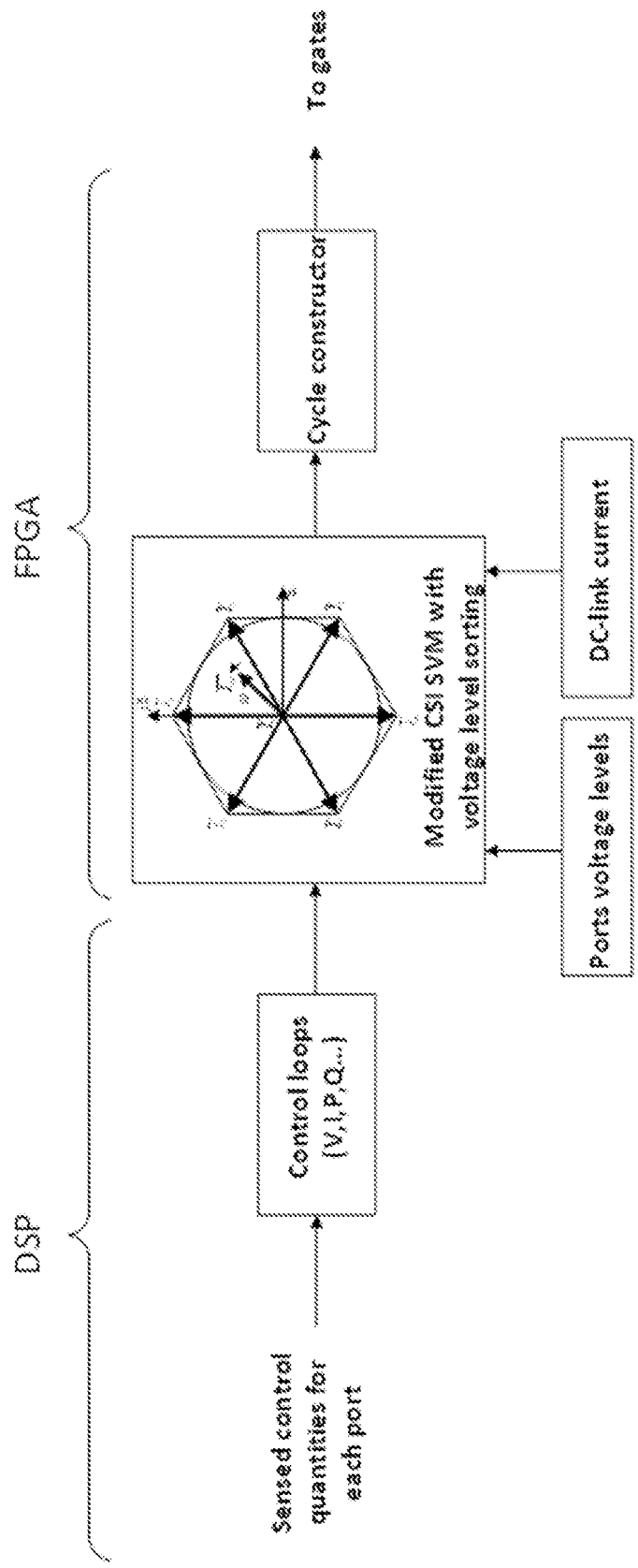
FIG. 8 provides a simplified bridge control block diagram for a power converter system, in accordance with an exemplary embodiment of the present disclosure.

A simplified and generic control block diagram for LV bridge pole-HV bridge pair is shown in FIG. 8. This can be implemented in a conventional DSP-FPGA control architecture. The modulation can be achieved through a modified CSI space vector modulation strategy with proper active vector ordering. The switching cycle can be constructed using the selected active vectors from each bridge. Finally, higher-level control loops can be used to realize the desired control action at the port level (e.g., V, I, P, Q, etc.).

Figure 9:
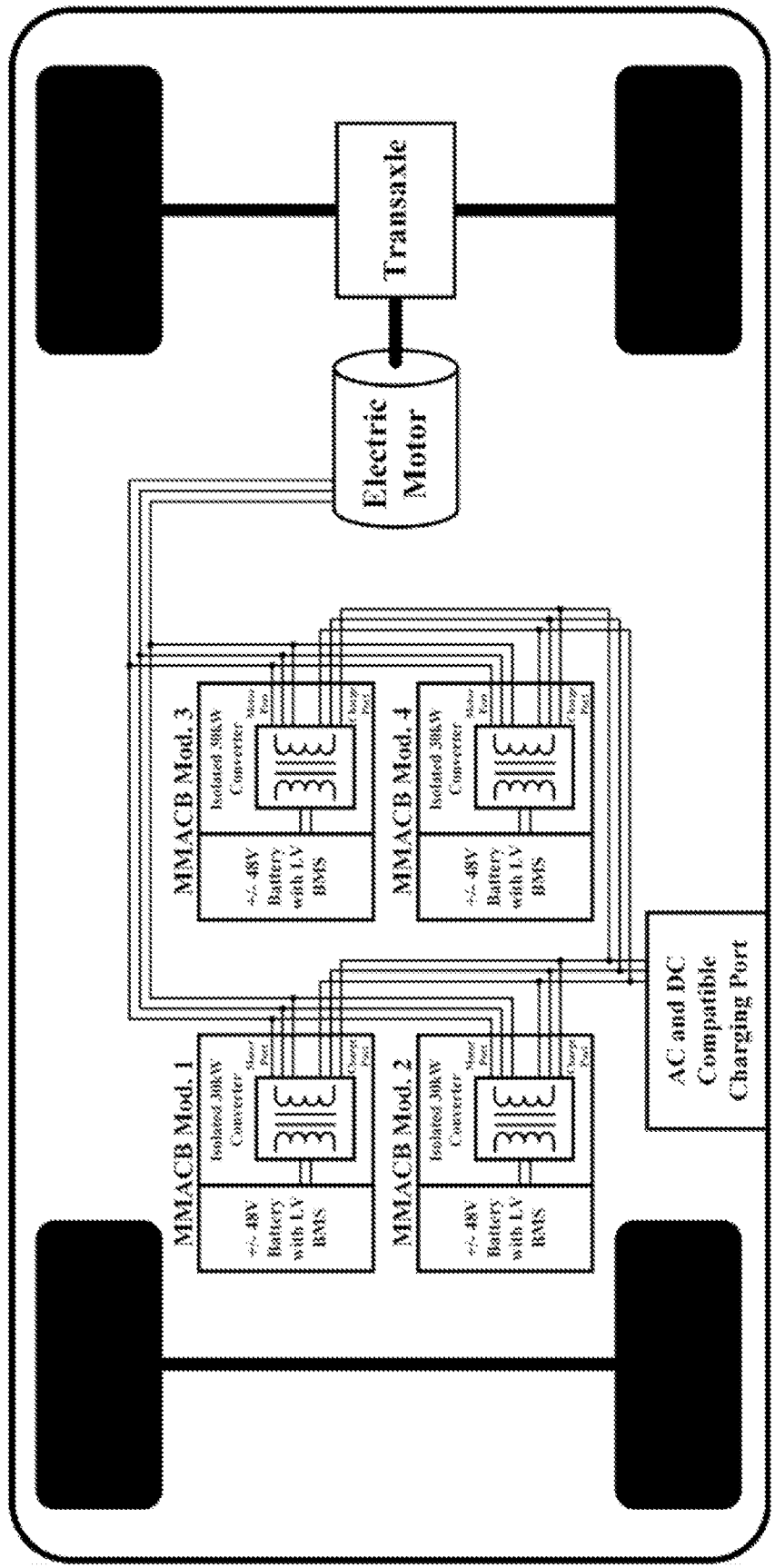
FIG. 9 provides an exemplary electric vehicle power architecture using multiple modular multiport AC battery power converter systems connected in parallel to control a single electric motor at higher power, in accordance with an exemplary embodiment of the present disclosure.
Figure 10:
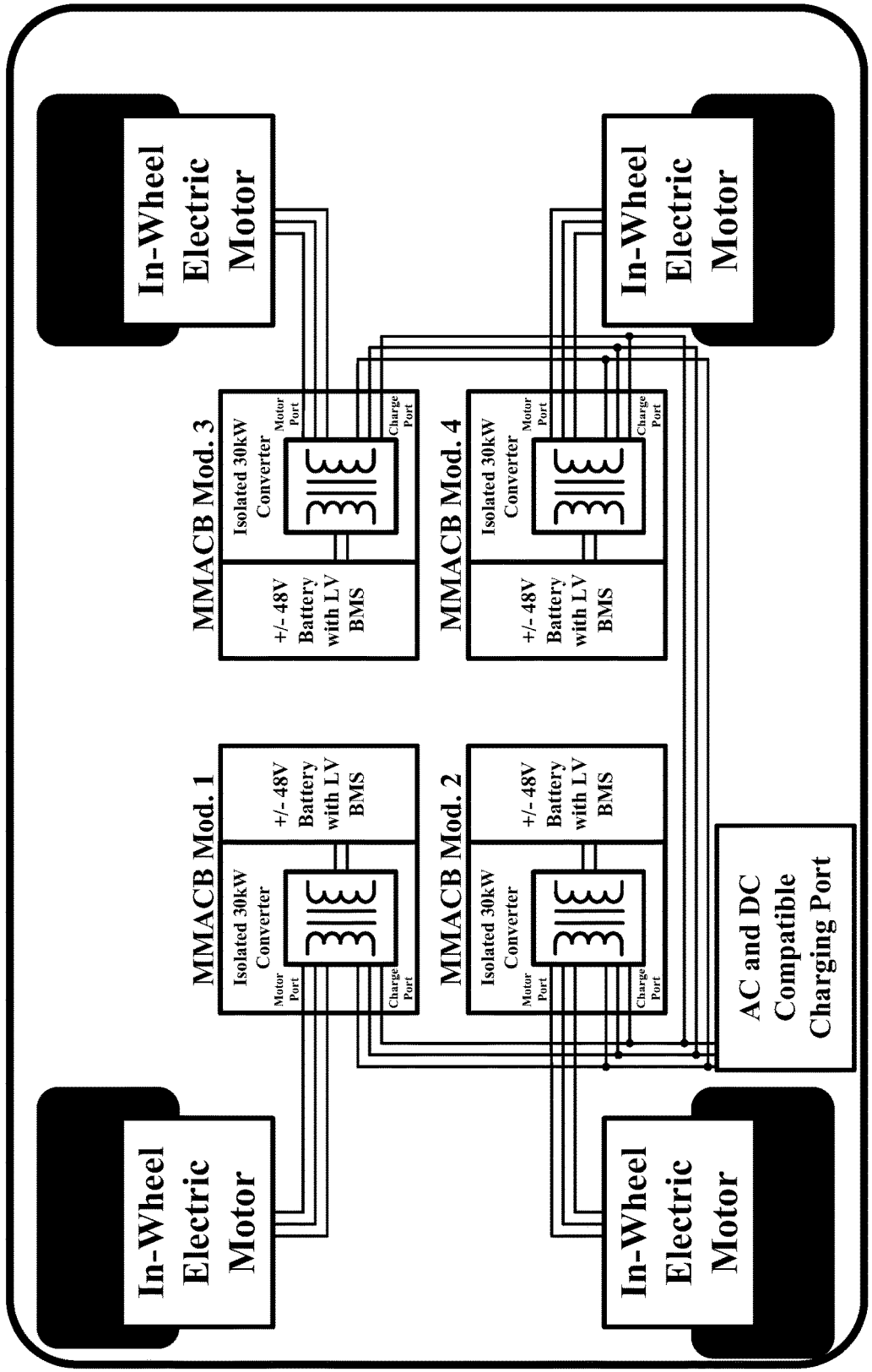
FIG. 10 provides an exemplary electric vehicle power architecture using multiple modular multiport AC battery power converter systems each controlling a dedicated electric motor, in accordance with an exemplary embodiment of the present disclosure.

The intrinsically safe MMACB architecture disclosed herein can have profound impact on battery energy storage applications, particularly in transportation systems rated in the hundreds of kilowatts and more. The MMACB eliminates a major safety concern by realizing touch-safe conditions, even following major accidents and breach of the battery stacks, and does so without impacting performance, size, or cost (at scale). Multiple MMACBs can be flexibly located in a vehicle and can be upgraded or replaced as needed without impact. Vehicle design is simplified as all power/energy management functions are integrated into one flexible, modular, and scalable building block. An exemplary power architecture for electric vehicle, using four 30 kW MMACB power conversion systems connected in parallel to drive a single 120 kW Electric Motor is shown in FIG. 9. An exemplary power architecture for electric vehicle, using four 30 kW MMACB power conversion systems, each driving an independent 30 kW in-wheel motor is shown FIG. 10. In both FIG. 9 and FIG. 10 the four MMCAB power conversion system can exchanged energy through the parallel connection on the AC or DC charging port. The MMACBs can easily, with minimal size and cost penalty, be extended to realize multiport functionality, including control of dual motors and DC or AC input charging functions. Unlike traditional EV inverters, soft switching and filtered waveforms reduce EMI, motor losses, and bearing currents, and do not require proximity between inverters and motors. MMACB controlled battery charging can reduce energy losses can enable significant improvement in miles/minute of driving range that can be added, and can reduce in total charging times. MMACBs can also allow fast charging using 3-phase AC, eliminating the cost and need for an expensive nationwide DC fast charging infrastructure—with dramatic impact on roll out of EVs. Finally, MMACBs can provide advanced V2G, V2H, and microgrid functionality, enabling EVs to become an integrated element in the future grid ecosystem.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A power conversion system comprising:
a first current source converter bridge, configured to connect a first battery module and a second battery module and low voltage sides of a first transformer and second transformer, wherein a mid-point of a serial connection of the first and second battery module is connected to a mid-point of a serial connection of the first and second transformer; and
a second current source converter bridge configured to connect to a high voltage side of the first transformer and one or more ports configured to transmit electrical power to and/or receive electrical power from an electrical load and/or source.

2. The power conversion system of claim 1, wherein the first current source converter bridge comprises a first switching circuit configured to selectively connect a first pole of the first battery module and an opposite pole of the second battery module to a terminal of the low voltage side of the first transformer.

3. The power conversion system of claim 2, wherein the first switching circuit comprises a first controllable switch serially connected with a second switch.

4. The power conversion system of claim 3, wherein the first controllable switch is a Si MOSFET.

5. The power conversion system of claim 3, wherein the second switch is selected from the group consisting of a diode, a controllable switch, and a GaN HEMT.

6. The power conversion system of claim 3, wherein the first switching circuit further comprises a first resonant pole network connected in parallel with the serially connected first controllable switch and second switch.

7. The power conversion system of claim 6, wherein the first resonant pole network is configured to enable a ZVS turn-OFF and ZCS turn-ON of the first controllable switch in the first switching circuit.

8. The power conversion system of claim 6, wherein the first resonant pole network comprises a capacitor serially connected to a resistor-diode circuit.

9. The power conversion system of claim 8, wherein the resistor-diode circuit provides a different impedance during charging and discharging of the capacitor of the first resonant pole network.

10. The power conversion system of claim 2, wherein the first switching circuit comprises a first clamping device configured to allow power to flow from the first transformer to the second battery module.

11. The power conversion system of claim 10, wherein the first clamping device is selected from the group consisting of a diode, a controllable switch, and a GaN HEMT.

12. The power conversion system of claim 10, wherein the first switching circuit further comprises:
a first controllable switch serially connected with a second switch; and
a bypass capacitor connected in series to the first clamping device;
wherein the series connection of the bypass capacitor and the first clamping device is connected in parallel to the first controllable switch serially connected to the second switch.

13. The power conversion system of claim 1 further comprising:
the first battery module;
the second battery module serially connected to the first battery module;
the first transformer having the low voltage side and the high voltage side;
the second transformer having the low voltage side and the high voltage side; and
a third current source converter bridge configured to connect to the high voltage side of the second transformer and one or more of the ports configured to transmit electrical power to and/or receive electrical power from an electrical load and/or source;
wherein the low voltage side of the first transformer is serially connected to the low voltage side of the second transformer;
wherein the first current source converter bridge comprises a first switching circuit configured to selectively connect a first pole of the first battery module and an opposite pole of the second battery module to a terminal of the low voltage side of the first transformer; and
wherein the first current source converter bridge further comprises a second switching circuit configured to selectively connect a first pole of the second battery module and an opposite pole of the first battery module to a terminal of the low voltage side of the second transformer.

14. The power conversion system of claim 13, wherein the second switching circuit comprises a first controllable switch serially connected with a second switch; and
wherein at least one of:
the first controllable switch is a Si MOSFET; or
the second switch is selected from the group consisting of a diode, a controllable switch, and a GaN HEMT.

15. The power conversion system of claim 14, wherein the second switching circuit further comprises a second resonant pole network connected in parallel with the serially connected first controllable switch and second switch; and
wherein at least one of:
the second resonant pole network is configured to enable a ZVS turn-OFF and ZCS turn-ON of the first controllable switch in the second switching circuit; or
the second resonant pole network comprises a capacitor serially connected to a resistor-diode circuit.

16. A power conversion system comprising:
a first battery module;
a second battery module connected to the first battery module;
a first transformer having a low voltage side and a high voltage side;
a second transformer having a low voltage side and a high voltage side, wherein the low voltage side of the first transformer is connected to the low voltage side of the second transformer;
a first current source converter bridge configured to connect the first and second battery modules and the low voltage sides of the first and second transformers;

a second current source converter bridge configured to connect to the high voltage side of the first transformer and one or more ports configured to transmit electrical power to and/or receive electrical power from an electrical load and/or source; and a third current source converter bridge configured to connect to the high voltage side of the second transformer and one or more of the ports configured to transmit electrical power to and/or receive electrical power from an electrical load and/or source;

wherein a mid-point of the connection of the first and second battery module is connected to a mid-point of the connection of the first and second transformer.

17. The power conversion system of claim 16, wherein at least one of:

the second battery module is serially connected to the first battery module;

the low voltage side of the first transformer is serially connected to the low voltage side of the second transformer;

the first current source converter bridge comprises a first switching circuit configured to selectively connect a first pole of the first battery module and an opposite pole of the second battery module to a terminal of the low voltage side of the first transformer;

the first current source converter bridge comprises a second switching circuit configured to selectively connect a first pole of the second battery module and an opposite pole of the first battery module to a terminal of the low voltage side of the second transformer;

the first current source converter bridge comprises a second switching circuit configured to selectively connect a first pole of the second battery module and an opposite pole of the first battery module to a terminal of the low voltage side of the second transformer, wherein the second switching circuit comprises a second clamping device configured to allow power to flow from the second transformer to the first battery module; or the first current source converter bridge comprises:
a first switching circuit configured to selectively connect a first pole of the first battery module and an opposite pole of the second battery module to a terminal of the low voltage side of the first transformer; and
a second switching circuit configured to selectively connect a first pole of the second battery module and an opposite pole of the first battery module to a terminal of the low voltage side of the second transformer.

18. The power conversion system of claim 17, wherein the second clamping device is selected from the group consisting of a diode, a controllable switch, and a GaN HEMT.

19. The power conversion system of claim 16, wherein the first current source converter bridge comprises a second switching circuit configured to selectively connect a first pole of the second battery module and an opposite pole of the first battery module to a terminal of the low voltage side of the second transformer; and wherein the second switching circuit comprises:
a first controllable switch serially connected with a second switch;
a second clamping device configured to allow power to flow from the second transformer to the first battery module; and
a bypass capacitor connected in series to the second clamping device so that the series connection of the bypass capacitor and the second clamping device is connected in parallel to the first controllable switch serially connected to the second switch.

20. The power conversion system of claim 16, wherein:
the second battery module is serially connected to the first battery module;
the low voltage side of the first transformer is serially connected to the low voltage side of the second transformer;
the first current source converter bridge comprises a first switching circuit comprising:
a first controllable switch serially connected with a second switch; and
a first clamping device configured to allow power to flow from the first transformer to the second battery;
the first current source converter bridge further comprises a second switching circuit configured to selectively connect a first pole of the second battery module and an opposite pole of the first battery module to a terminal of the low voltage side of the second transformer;
the second switching circuit comprises:
a first controllable switch serially connected with a second switch; and
a second clamping device configured to allow power to flow from the second transformer to the first battery;
the first controllable switch serially connected with the second switch of the first switching circuit is connected in series to the second clamping device of the second switching circuit; and
the first clamping device of the first switching circuit is connected in series to the serially connected first controllable switch and second switch of the second switching circuit.

21. The power conversion system of claim 16, wherein the second battery module is serially connected to the first battery module;

wherein the low voltage side of the first transformer is serially connected to the low voltage side of the second transformer; and wherein the power conversion system is free of a resonant circuit connected in parallel across the low voltage side of one or more transformers selected from the group consisting of the first transformer, the second transformer, and both the first and second transformers.

22. The power conversion system of claim 16, wherein the second battery module is serially connected to the first battery module;

wherein the low voltage side of the first transformer is serially connected to the low voltage side of the second transformer;

wherein the second current source converter bridge comprises a first resonant circuit connected in parallel to the high voltage side of the first transformer; and wherein the third current source converter bridge comprises a second resonant circuit connected in parallel to the high voltage side of the second transformer.

23. The power conversion system of claim 16, wherein the second battery module is serially connected to the first battery module;

wherein the low voltage side of the first transformer is serially connected to the low voltage side of the second transformer; and wherein at least one of the second and third current source converter bridges comprises at least one reverse blocking switch.

24. The power conversion system of claim 23, wherein at least one reverse blocking switch comprises a controllable switch connected in series to a diode.

25. The power conversion system of claim 23, wherein at least one reverse blocking switch comprises a first and second controllable switch connected in series with opposite current blocking orientation.

26. The power conversion system of claim 16, wherein the second battery module is serially connected to the first battery module;
wherein the low voltage side of the first transformer is serially connected to the low voltage side of the second transformer; and
wherein the power conversion system is configured such that a maximum voltage in the system is a voltage level of the first or second battery modules when the first, second, and third current source converter bridges are inactive.

27. The power conversion system of claim 26, wherein the voltage level of the first or second battery modules is less than 60 Volts.

28. The power conversion system of claim 16, wherein the second battery module is serially connected to the first battery module;
wherein the low voltage side of the first transformer is serially connected to the low voltage side of the second transformer; and
wherein the first current source converter bridge is configured to operate in a switching cycle.

29. The power conversion system of claim 28, wherein the switching cycle comprises a cross-clamped phase where power flows from at least one of the first and second transformers to at least a pole of the opposite at least one of the first and second battery modules through at least one clamping device.

30. The power conversion system of claim 16, wherein at least one of:
the second battery module is serially connected to the first battery module;
the low voltage side of the first transformer is serially connected to the low voltage side of the second transformer;
the first current source converter bridge is configured such that a majority of leakage energy from at least one of the first and second transformers is recovered into at least one of the first and second battery modules;
the power conversion system is configured to operate in a fail-safe state where controllable power devices connected to the first, second, and third current source converter bridges are turned OFF and magnetizing current of at least one of the first and second transformers is discharged into at least one of the first and second battery modules;
one of the ports of the second and third current source converter bridges is a first port connected to a first electrical motor; or
two of the ports of the second and third current source converter bridges are a first port connected to a first electrical motor and a second port connected to a charging terminal.

31. The power conversion system of claim 16, wherein the second battery module is serially connected to the first battery module;
wherein the low voltage side of the first transformer is serially connected to the low voltage side of the second transformer; and
wherein three of the ports of the second and third current source converter bridges comprise:
a first port connected to a first electrical motor and a second port connected to a charging terminal; and
a third port connected to a second electrical motor.

32. The power conversion system of claim 16, wherein the second battery module is serially connected to the first battery module;
wherein the low voltage side of the first transformer is serially connected to the low voltage side of the second transformer; and
wherein two of the ports of the second and third current source converter bridges comprise:
a first port connected to a first electrical motor; and
a second port connected to a second electrical motor.

33. A modular battery system comprising:
a first power conversion system of claim 16; and
a second power conversion system of claim 16;
wherein each of the power conversion systems has the second battery module serially connected to the first battery module, and the low voltage side of the first transformer serially connected to the low voltage side of the second transformer; and
wherein the first power conversion system and the second power conversion system are connected in parallel on at least one of the ports of the first and second power conversion systems configured to transmit electrical power to and/or receive electrical power from an electrical load and/or source.

* * * * *